Figure 1:
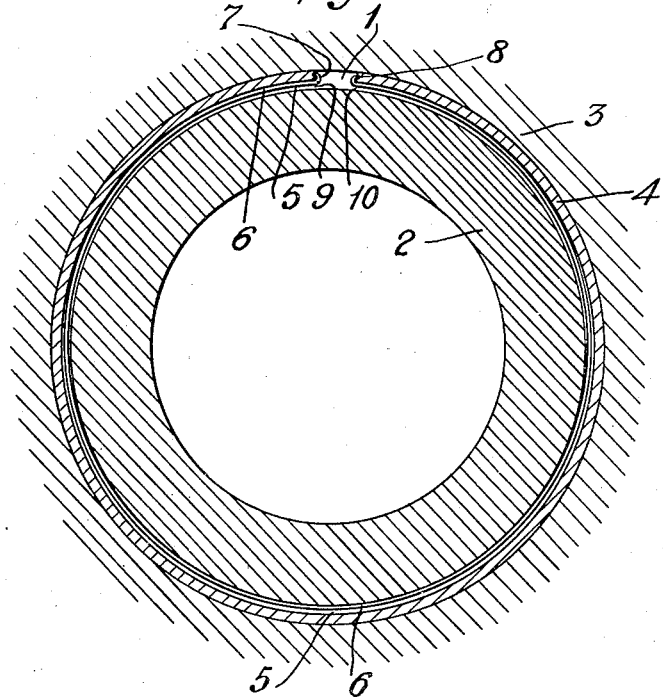

Jan. 15, 1935.  S. C. NEWSON  1,987,840
PISTON RING
Filed Feb. 2, 1933

INVENTOR
SIDNEY C. NEWSON,
BY Carroll Bailey
ATTORNEY

Patented Jan. 15, 1935

1,987,840

UNITED STATES PATENT OFFICE 1,987,840

PISTON RING

Sidney Charles Newson, Southwark, London, England

Application February 2, 1933, Serial No. 654,934
In Great Britain June 28, 1932

1 Claim. (Cl. 309—43)

This invention relates to improvements in piston rings.

The object of the invention is to provide a piston ring which will counteract wear of the ring and fatigue of its material and increase the pressure exerted by the resiliency of the ring upon the cylinder wall. The advantages gained thereby are a materially prolonged life of the piston ring and assured gas-tight fitting in the cylinder bore throughout the prolonged life of the ring.

With this object in view and in accordance with this invention, there is provided, in combination with a piston ring having two free ends, a spring housed within a groove in the ring and acting substantially tangentially outwardly upon the said free ends of the piston ring.

In the accompanying drawing:

Figure 1 is a cross sectional view of an assembly of a cylinder and piston of an internal combustion engine, showing the disposition of the piston ring and its spring; and Figure 2 is a fragmentary perspective of the piston ring.

Referring to the drawing, in the usual groove 1 of the piston 2 reciprocating in the cylinder 3 there is disposed a piston ring 4 in the usual manner.

Formed in the inside surface of the piston ring 4 is a groove 5 wherein is housed a split, substantially circular spring 6 which has its free ends 7 and 8 directed outwardly and reversely as shown and bearing against the free ends 9 and 10 of the piston ring 4.

In this manner a tangential, or approximately a tangential force is exerted on the piston ring by the spring 6 tending to increase the diameter of the ring 4 and thereby to increase the pressure it exerts on the bore of the cylinder 3 due to its resiliency. The spring 6, not being exposed to wear or fatigue, will always press the piston ring 4 against the cylinder wall with the required pressure, even if the piston ring becomes worn or in case of fatigue of its material and consequent loss of resiliency, thereby prolonging the useful life of the piston ring and maintaining its efficiency throughout its prolonged life.

By reference to Figure 1 it will be observed that the spring 6 is of such size relative to the ring 4 that when said spring is disposed in the groove or channel of said ring and the ring is disposed within the cylinder 3, the spring contacts with the ring only in the vicinity of the ends of the latter and is spaced from the base of the groove or channel in the ring substantially throughout the length or circumference of the spring. This permits the spring 6 to act much more effectively to expand the ring 4 to compensate for wear than would be the case if the spring engaged the base of the groove or channel in the ring throughout any substantial part of the length of the spring.

The invention is applicable to internal combustion engines or any other type of engine or apparatus wherein piston rings are employed.

I claim:—

In combination, a one-piece split resilient piston ring having a groove coextensive in length therewith and opening through its inner face, and an expansible spring in the form of a split ring disposed within said groove and having its ends directed outwardly and reversely and engaged against the ends of the ring, whereby the spring exerts a substantially tangential ring expansive force on the ring ends, said spring being of such length relative to the ring that when engaged adjacent to its ends with the base of the groove in the ring adjacent to the ends of the latter it is spaced throughout a major portion of its length from the base of the groove in the ring.

SIDNEY CHARLES NEWSON.

CERTIFICATE OF CORRECTION

Patent No. 1,987,840.            January 15, 1935.
Sidney Charles Newson.

It is hereby certified that error appears in the above numbered patent requiring correction as follows: In the drawing. Fig. 2, as shown below, should appear as part of the patent-

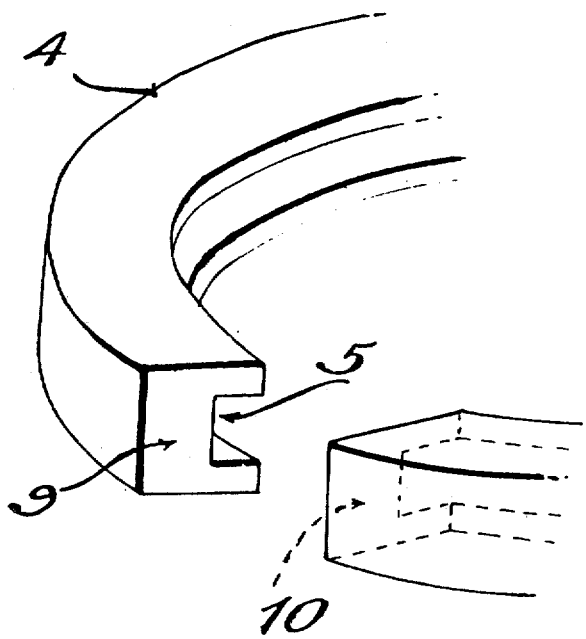

and that the said Letters Patent should be read with this correction therein that the same may conform to the record of the case in the Patent Office.

Signed and sealed this 26th day of March, A. D. 1935.

(Seal)                      Leslie Frazer
                          Acting Commissioner of Patents.